United States Patent [19]

Herold

[11] 4,267,908
[45] May 19, 1981

[54] UNILATERALLY ALTERNATING BACKLASH TORQUE LOCK

[75] Inventor: Horst Herold, Aschaffenburg, Fed. Rep. of Germany

[73] Assignee: Petri AG, Aschaffenburg, Fed. Rep. of Germany

[21] Appl. No.: 23,476

[22] Filed: Mar. 23, 1979

[30] Foreign Application Priority Data

Mar. 25, 1978 [DE] Fed. Rep. of Germany ....... 2813095

[51] Int. Cl.³ ................... F16D 67/02; F16D 49/02
[52] U.S. Cl. ................................................ 192/8 C
[58] Field of Search ................ 192/8 C, 8 R, 7; 188/134

[56] References Cited

U.S. PATENT DOCUMENTS

| | | | |
|---|---|---|---|
| 1,997,646 | 4/1935 | Miller | 192/8 C |
| 2,819,777 | 1/1958 | Kosch | 192/8 C |
| 2,946,417 | 7/1960 | Hungerford | 192/8 C |

*Primary Examiner*—George H. Krizmanich
*Attorney, Agent, or Firm*—Schwartz, Jeffery, Schwaab, Mack, Blumenthal & Koch

[57] ABSTRACT

Disclosed is a unilaterally alternating backlash torque locking mechanism which comprises a frame member, a control member having a longitudinally extending tubular portion, a longitudinally extending torque transmission member in rotational engagement about its axis with the control member, a sleeve member fixedly mounted on the frame member and extending radially adjacent the tubular portion of the control member and two loop springs embracing said control element in a loosely sliding arrangement against the sleeve member and extending at their inner and outer ends into recesses in the control member.

9 Claims, 2 Drawing Figures

UNILATERALLY ALTERNATING BACKLASH TORQUE LOCK

BACKGROUND OF THE INVENTION

1. Field of the Invention

The invention concerns a unilaterally alternating backlash torque lock for mechanical control elements, couplings and the like, particularly for the steering gear of directly steered vehicles, such as fork lifts, industrial floor vehicles, etc., comprising an actuating member, a control and braking member. More particularly, the invention relates to an improved braking member comprising two loop springs surrounding a control element in slightly prestressed arrangement. The loop springs are connected at their ends with a power transfer part (or controlled member) and resting with their outer surfaces in a loosely sliding arrangement against a sleeve which communicates with an actuating member and is fixedly mounted on a frame.

2. Background Art

In mechanical torque transmitting systems, wherein the part driving the control element is exposed by backlash by the part being controlled, so-called laterally acting or unilaterally alternating torque locks are used. Torque locks of this type serve in fork lifts, equipped with direct ratio steering gears to brake back-lashing torque impacts caused by roughness of the road or other obstacles. As an example, impacts occurring at the steered wheels are transmitted by means of the steering column directly back to the direct steering means used in these vehicles and may attain strengths capable of inflicting severe injuries to hands, even in the case of low impact velocities. In steering brakes necessary for this type of utility, a loop spring often acts as the effective braking part. It is arranged between the outer part of the hub connected with the steering column as the actuating member and the inner part of the hub fastened to the steering column tube and acting as the brake drum. The inner part of the hub is also fixedly attached to a frame member.

In a known steering brake of this type, a single part loop spring is provided as the effective brake part. The spring is equipped for the purpose of fastening it to the outer part of the hub with a recessed groove each in its center area and its ends, and a pivot which is securely attached to the flange of the outer part of the hub surrounded by the spring engaging each of the grooves. This known steering brake has certain severe disadvantages. One disadvantage is that partial embossing of the loop spring is required for the formation of the grooves and represents an undesirable weakening of the spring, particularly since the groove located in the center area may be applied only by means of highly complex and thus expensive equipment. Another substantial disadvantage consists in the fact that the axial mounting of the loop springs onto the power transmission part is effected over a protruding driving pin secured to the power transmission part requiring extensive spreading of the spring during the mounting operation. This makes it necessary to use a spring material soft enough to permit such spreading. A spring of such low coiling strength then augments the disadvantage of the reduction in cross section resulting from the application of a groove in the spring.

SUMMARY OF THE INVENTION

It is, therefore, an object of the present invention to provide a unilaterally alternating backlash torque lock mechanism that overcomes the disadvantages of prior art single part loop spring braking parts. The invention comprises the employment of a braking part utilizing two loop springs in contact with and surrounding the control element and being equipped at both their inner and outer ends with angled pins engaging the corresponding groove or recesses of the control element. Each of the springs have an equal number of turns.

The unilaterally alternating backlash torque locking mechanism comprises a frame member, a control member having a longitudinally extending tubular portion, a longitudinally extending torque transmission member in rotational engagement about its axis with the control member, a sleeve member fixedly mounted on the frame members and extending radially adjacent the tubular portion of the control member and two loop springs embracing the control element in a loosely sliding arrangement against said sleeve member and extending at their inner and outer ends into recesses in the control member. The inner ends of the loop springs abut adjacent one another in one of the recesses in the control member.

The invention thus provides a loop spring torque locking mechanism comprising an effective braking part that may be produced in a very simple manner merely by the angling of the ends of the springs and mounted by simple sliding without spreading onto the control element whereby the detailed design, i.e. particularly the direction of the angling of the springs may be adapted to existing requirements without functional interference and without the need for additional machinery. Thus, for example, in the case of straight, unstepped torque shafts as the control elements all angling may be directed inwardly into the space surrounded by the loop springs and the torque shaft equipped with the corresponding groove recesses. Also for example, when flanged torque shafts are used, the recesses for the pins may be directed in part inwardly with a suitable arrangement of the recesses in the shaft and in part angled off in a direction parallel to the shaft while a blind hole recess is applied to the flange part. Due to the design of the loop springs according to the invention, there is no need of forcing the springs over protruding parts, so that the thickness of the springs may be chosen as desired. The spring loops themselves are not weakened anywhere.

In another embodiment of the invention, the longitudinal slitting of the control element is either not possible or undesirable and the control element is provided with a radial bearing bore to receive the internally located, inwardly angled pin. The bearing bore accepts a drive pin with a longitudinal slit, with the inwardly protruding drive pins of the suitably dimensioned control element being axially inserted in the longitudinal slit. The embodiment is particularly suitable for multiple part control elements consisting of sleeves telescoped into each other, whereby the outer sleeve is conveniently provided with a slit like recess and the inner part with a transverse bore to receive the drive pin. In such cases, it is convenient to provide a spacer element to be inserted between the drive pin, the loop spring and the inner part of the sleeve. This spacer is axially inserted in a simple manner following the mounting of the spring and is secured in its position in any manner described.

BRIEF DESCRIPTION OF THE DRAWINGS

The invention is further illustrated by means of the drawings attached hereto.

DETAILED DESCRIPTION OF THE PREFERRED EMBODIMENTS

Figure 1:
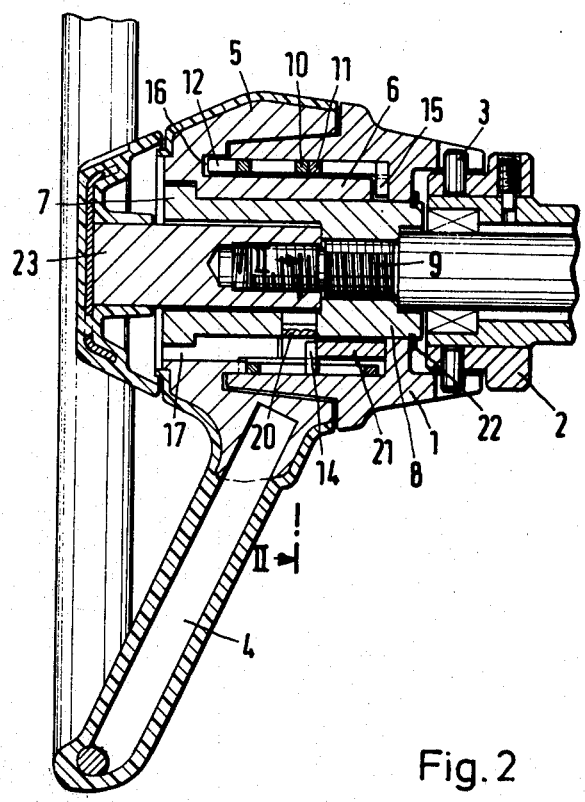
FIG. 1 is a side sectional view of a unilaterally alternating torque lock mechanism of the type used in a vehicle steering brake.

In FIG. 1 the lower part of the hub of a steering wheel is shown at 1 mounted rigidly by means of a securing ring 2 on a steering tube or shaft (not shown). The lower part of hub 1 and securing rings 2 are positively connected with each other by means of cylindrical pins 3. The upper part of the hub comprises two parts, the hub crown 5 carrying the spokes of the steering wheel 4 with the associated shaft tube 6 and a drive pin sleeve 8 equipped with a hexagonal head 7. (The terms lower part of the hub and upper part may also be called "inner part" and outer part respectively throughout this description). The drive pin sleeve is inserted axially in the hub crown with its hexagonal head engaging a corresponding recess of hub crown 5. Drive pin sleeve 8 is provided inside with a serration 9 which after assembly, engages a corresponding counter serration of the steering shaft. In this manner, the actuating member or steering wheel communicates with the control member on upper part of the hub and the acting member or steering shaft.

Between the lower part of the hub and its upper part, two loop springs are arranged. In the preferred steering system, the unilaterally alternating backlash torque lock function is performed by the arrangement of the members with the lower part of the hub, the brake drum fixedly mounted on the frame and the loop springs representing the effective part of the brake.

Figure 2:
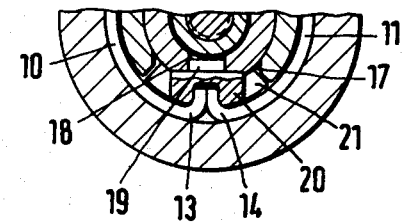
FIG. 2 shows a cross-sectional along II—II of FIG. 1.

In the embodiment disclosed in FIG. 2, the brake part is formed by the two springs 10 and 11 embracing the flange of the upper part of the hub by an equal number of turns. The springs are equipped at their respective ends with angled drive pins 12, 13, 14 and 15 engaging the corresponding recesses of the upper part of the hub (see both FIGS. 1 and 2). In the example illustrated herein, the drive pin 12, overreaching the shaft tube 6 to the greatest extent, is angled in a direction parallel to the center axis and engages a recess in the form of a blind bore 16, arranged in the hub crown 5, while the angled pin 15 is angled inwardly and engages a recess in the rim of the shaft tube 6.

The inner pins 13 and 14, shown adjacent to each other in FIG. 2, are angled in a direction leading into the inner space of the loop springs. In this manner, a two-part control element is utilized wherein the outer shaft tube 6 has a longitudinally aligned slit recess 17, together with a transverse bore 18 in the inner drive sleeve 8, to receive a pin plug 19 of a drive pin 20 additionally equipped with an axial slit. The angled pins 13, 14 engage the slit of said drive pin 20 without clearance.

To further demonstrate the advantages of the invention, the following describes the extraordinarily simple assembly of the embodiment of the invention illustrated in FIGS. 1 and 2.

First, drive sleeve 8 is inserted in hub crown 5 until hexagonal head 7 engages the corresponding recess. Then drive pin 20 is inserted into the corresponding transverse bore 18 of the drive sleeve 8, with its pin plug 19. The two springs 10 and 11 are installed simply by sliding them over shaft tube 6 so that pins 12 and 14 engage their respective recesses and so that pins 13 and 15 become engaged without clearance in the axial slit of drive pin 20. Subsequently, spacer 21 is inserted, again in the axial direction, between drive sleeve 8 and loop spring 11 into the slit like recess 17. Next, the lower part of the hub is pushed axially onto the upper part of the hub and is secured by means of fastening ring 22 against drive sleeve 8. The steering wheel completed in this manner may then be mounted by means of the engagement of serration 9 in the counter serration of the steering shaft and the lower part of the hub may then be secured against rotation my means of the securing ring 2 on the steering shaft tube. The upper part of the hub is rigidly mounted on the steering shaft by means of a clamping device 23.

In operation, the device functions as follows.

A torque impact representing a backlash originating in the wheel being steered is transmitted by means of serration 9 to drive sleeve 8 of the upper part of the hub and acts by way of pins 13 or 14 without clearance and depending on the direction of rotation of the backlash on one of springs 10 or 11, causing the impacted spring to spread under the effect of friction and to contact lower part 1 of the hub, which is rigidly mounted on the steering column tube. The torque impact backlashing from the steering mechanism is thus contained without slipping. Since the turn of the springs is to the right with respect to the direction of the steering shaft, torque impacts acting on the steering wheel in the sense of a rotation to the left actuate spring 10 while torque impacts acting on the steering wheel in the sense of a rotation to the right actuate spring 11. In case of action in the reverse direction, i.e. steering rather than backlash dampening, if the steering wheel is turned to the left, spring 10 contracts inwardly in the sense of the release of the frictional force acting between the loop spring and the lower part of the hub, because of the tensile force acting upon pin 12, while the tensile force affecting pin 14 has the same effect on the spring 11. When the steering wheel is turned to the right, spring 11 contracts because of the tensile force exercized on pin 15 and spring 10, and because of the force affecting pin 13, so that no braking action interferring with steering occurs.

What is claimed is:

1. A unilaterally alternating backlash torque locking mechanism comprising a frame member, a control member having a longitudinally extending tubular portion, a longitudinally extending torque transmission member in rotational engagement about its axis with said control member, a sleeve member fixedly mounted on said frame member and extending radially adjacent said tubular portion of said control member and two loop springs embracing said control element in a loosely sliding arrangement against said sleeve member and extending at their inner and outer ends into recesses in said control member said inner ends abutting adjacent each other in one of said recesses.

2. The unilaterally alternating backlash torque locking mechanism of claim 1 wherein the control member is a steering gear of a directly steered vehicle.

3. The unilaterally alternating backlash torque locking mechanism of claim 1 wherein said loop springs embrace the outside surface of said control member and rest loosely against the inside surface of said sleeve member.

4. The unilaterally alternating torque locking mechanism of claims 1, 2 or 3 further comprising a drive pin connecting said control member and said torque transmission member wherein the control member is provided with a radially extending bore for said drive pin and said drive pin possess a longitudinal slit and at least one end of each loop spring is inserted into said longitudinal slit.

5. The unilaterally alternating torque locking mechanism of claims 1, 2 or 3 further comprising a drive pin connecting said control member and said torque transmission member wherein the control member consists of a plurality of sleeve-like parts axially inserted into each other with the outer sleeve displaying a slit-like recess and the inner sleeve displaying a transverse bore to receive said drive pin.

6. The unilaterally alternating torque locking mechanism of claims 1, 2 or 3, further comprising a drive pin connecting said control member and said torque transmission member and a spacer part arranged in an area defined by said drive pin, one of said loop springs and an inner sleeve part of said control member.

7. The unilaterally alternating torque locking mechanism of claim 4 wherein the inner ends of each loop spring engage the longitudinal slit of said drive pin without clearance.

8. A unilaterally alternating backlash torque locking mechanism comprising a frame member, a control member having a longitudinally extending tubular portion, a longitudinally extending torque transmission member in rotational engagement about its axis with said control member, a sleeve member fixedly mounted on said frame member and extending radially adjacent said tubular portion of said control member, two loop springs embracing said control element in a loosely sliding arrangement against said sleeve member and extending at their inner and outer ends into recesses in said control member and a drive pin connecting said control member and said torque transmission member wherein the control member is provided with a radially extending bore for said drive pin and said drive pin possess a longitudinal slit and at least one end of each loop spring is inserted into said longitudinal slit.

9. A unilaterally alternating backlash torque locking mechanism comprising a frame member, a control member having a longitudinally extending tubular portion, a longitudinally extending torque transmission member in rotational engagement about its axis with said control member, a sleeve member fixedly mounted on said frame member and extending radially adjacent said tubular portion of said control member, a drive pin connecting said control member and said torque transmission member wherein the control member consists of a plurality of sleeve-like parts axially inserted into each other with the outer sleeve displaying a slit-like recess and the inner sleeve displaying a transverse bore to receive said drive pin.

* * * * *